A. E. SPINASSE.
GLASS TANK.
APPLICATION FILED MAR. 31, 1917.

1,375,941.

Patented Apr. 26, 1921.
5 SHEETS—SHEET 1.

Witness
Edwin J Beller

Inventor
Arthur E. Spinasse
by
Chas. C. Stauffer
Attorney

A. E. SPINASSE.
GLASS TANK.
APPLICATION FILED MAR. 31, 1917.

1,375,941. Patented Apr. 26, 1921.
5 SHEETS—SHEET 2.

Inventor
Arthur E. Spinasse,
by
Witness
Edwin J Beller.
Attorney

UNITED STATES PATENT OFFICE.

ARTHUR E. SPINASSE, OF MOUNT VERNON, OHIO.

GLASS-TANK.

1,375,941. Specification of Letters Patent. Patented Apr. 26, 1921.

Application filed March 31, 1917. Serial No. 158,968.

*To all whom it may concern:*

Be it known that I, ARTHUR E. SPINASSE, a citizen of the United States, residing at Mount Vernon, county of Knox, State of Ohio, have invented certain new and useful Improvements in Glass-Tanks; and I do hereby declare the following to be a full, clear, and exact description of the invention, such as will enable others skilled in the art to which it appertains to make and use the same.

My invention relates to an improvement in glass tank furnaces which may be used in connection with drawing apparatus. In the construction of my glass furnace, I aim to provide one or a number of drawing openings or stations suitable for drawing glass cylinders or sheets, so as to enable me to effect the drawing from a mass of glass separated as little as may be from the main body of molten glass within the tank. I also aim to construct the exterior or main wall surrounding the body of molten glass from projecting drawing dog houses. Such projections, when they exist outside the line of wall whatever their nature, not only provide points from which heat is removed by the surrounding air, particularly during windy days or in drafty corners, thereby permitting and encouraging the loss and waste of valuable heat units, but the chilling of the said projections is apt to be attended by the chilling of parts of each small pool or segregated mass of glass at some points, thereby producing glass in the drawing dog house unequal in viscosity and of poor quality. This leads to the formation of glass articles with walls unequal in thickness, as well as to the creation of strains and stresses in the fragile newly formed glass with consequent loss by breakage.

The walls of glass melting tanks are of considerable thickness, approximately 16 to 18 inches or more. The drawing opening in a float or drawing ring or member may approximate 24 to 30 inches. I recess or part the wall of the tank furnace so that a portion up to one-half or more of my drawing opening may be established within the thickness of the wall or in the space provided by said recess; thus my drawing opening does not project outside the line of wall of the furnace body and extends only partly within the inner line of the wall, and into the interior of the tank chamber. This permits me to maintain the glass from which to draw very close to the main body of glass and thereby in proper constant temperature and purity, producing uniformity of product in drawing. Under some circumstances, the drawing opening or area may be entirely within the thickness of the wall. I am enabled to carry the recessed wall within the furnace, above the glass but a short way, or not at all with little or no wall support in the glass within the tank chamber, by means of the construction referred to. The substantial continuity of the wall on its outside is thus preserved, in that no projections of any kind permitting the dissipation of heat, are made.

By dispensing with drawing dog houses, the glass of the drawing pool is brought very close to the main body of glass. This renders the distance through which I have to float my drawing ring or member from a position for reducing in the tank chamber to a drawing position, very short, so that the glass is disturbed very little by such floating, thus maintaining good quality of glass and effecting a saving of time; while I am also enabled when desirable, to bring the furnace hood low, near the drawing station, so that it is near the glass, whereby the heated gases are reverberated upon the mass of molten glass and into the drawing station when idle, and when covered by a suitable lid.

The general construction affords also easy means to replace the blocks or walls of the furnace with little delay and great facility.

The drawing dog houses in glass furnace construction are always a source of trouble, and their use the cause of much vexatious loss of time and product. By establishing within the outer contour of the furnace wall drawing stations without making use of structure from which to draw, exterior to the said contour, I provide means for doing away, to a great extent, with the objections indicated.

I may at times provide an extension or forehearth for the purpose of heating the forward part of my drawing station or ring, keeping the body of glass in such extension near to the main body of the glass. In connection with my tank I may use any suitable form of shields, floats, and float holder members in drawing, and I may permit said members to partly project in the said forehearth. For heating purposes, suitable burners or heating means may be provided.

My invention will be understood by reference to the accompanying drawings, in which:

Fig. 15 illustrates another form of float holder of which Figs. 17, 18, 19 and 20 illustrate several modifications.

Fig. 16 shows a top plan view of a part of my tank furnace and drawing station with inner supporting made of special form.

Figs. 21 to 25 illustrate an improved support and tank wall or shade stone or the like.

Figure 1:
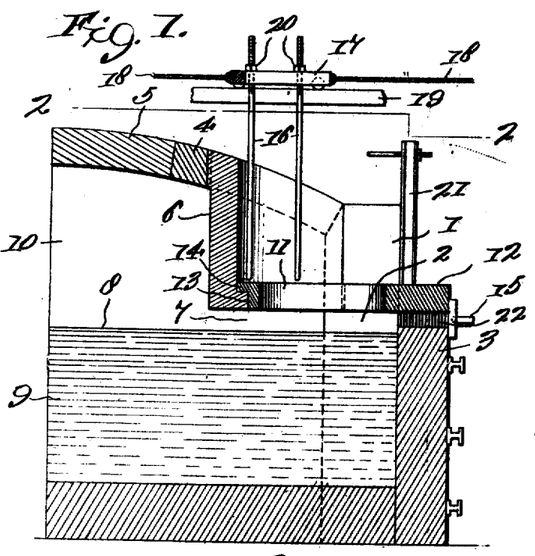
Figure 1 is a central vertical section of a glass furnace representing my invention.

Fig. 1 shows a partial side vertical section of a glass tank in accordance with my invention, which tank may be circular or square in general outer contour. The sign 1 designates the tank wall recessed or parted to provide space 2 in the thickness thereof; in this case, a wall 3 being placed outside in juxtaposition to said wall 1, in front of space 2; 4 is a recessed arch in the crown of the tank; 6 a vertical curved shade wall, which may be in sections, resting upon the wall 1, and preferably by means of boss 6' upon the arch 4, so as to leave underneath a space 7 above the glass contained in the tank 9, thus permitting the float or drawing members, as will be described later, to be, with little motion, floated from a position for reducing in the tank chamber 10, to drawing position under the opening 11, provided in the roof 12. The wall 6, in this case has supports 13, the roof 12 resting upon the walls 3 and 1, and upon said supports 13 by means of a partly annular flange 14.

It will be noted now that my drawing opening 11 extends within the tank chamber 10 and terminates within the thickness of the wall 1, or space provided therein, there being no projecting dog house outside the line of wall of the tank furnace, only the wall 3 in which I may provide burners 15.

I prefer to use additional hook supports 16, threaded at their ends for supporting the wall 6, connecting and passing through suitable opening provided, to a truck 17, which truck is moved laterally by suitable means 18 upon a track 19, so that by means of nuts 20 the wall may be adjusted vertically and may also be moved laterally on the track. 21 is a suitable form of bracing for the tank, which may be provided in any number and in the usual manner.

Figure 2:
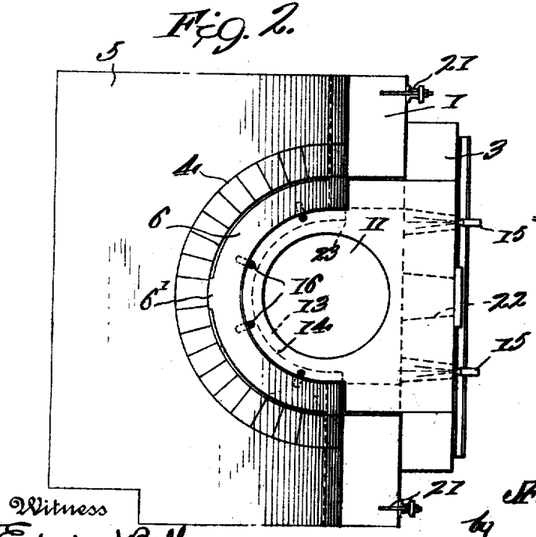
Fig. 2 is a top plan view taken on line 2—2 of Fig. 1.

Fig. 2 is a top plan view of Fig. 1 on line 2—2, showing in addition the side location of the burner 15; openings 22, which may be in any number, in the tank wall, being preferably provided to give access to the floats or drawing members and also to the tank chamber; the construction providing sufficient space at 23 between the glass 8 and the roof 12, to allow certain free passage of the reverberating tank heat, as well as that from the burner 15 into space 2.

Figure 3:
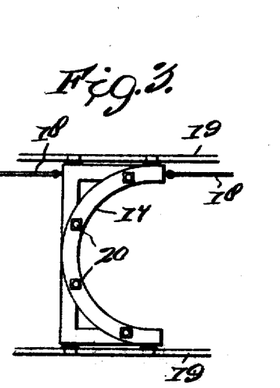
Fig. 3 is a top plan view of the carriage shown above line 2—2 in Fig. 1.

Fig. 3 is a top view of the truck or carriage 17 shown in Fig. 1 on double track 19, it being of a curved form frame as shown, to correspond with that of the wall 6, and permit the drawing of a glass cylinder. Rods or cable 18 may be provided on both sides.

Figure 4:
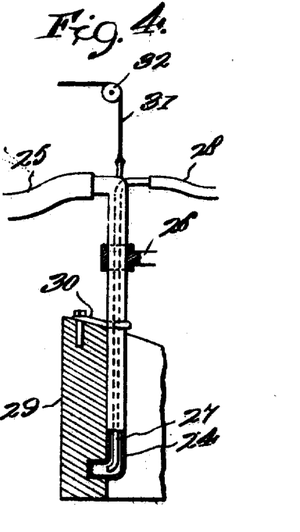
Fig. 4 shows a modified structure for supporting the wall.

Fig. 4 shows a modification of support which I may use in any number, to support my walls; it comprises a hollow hook support 24 having flexible outlet conduit 25 and sliding through guides 26. Pipe 27 and having flexible inlet conduit 28, is adjusted so as to circulate cooling fluid through support conduit 24. I show a fractional portion of wall 29 supported thereon, the sign 30 indicating additional holders to maintain the wall in proper position. Suitable means for raising and lowering may be provided as rod or cable 31 and wheels 32.

Figs. 5 to 8 illustrate enlarged sectional views of members or parts which I may use in combination with my improved tank, the same being made, of course, in suitable dimensional proportions. 33 designates a segregating float from which a glass cylinder, indicated by dotted lines 34, may be drawn, their lower opening 35 of the ring, or segregating float, being slightly reduced in diameter. Said float may have an outer gravity flange 36 for effecting proper submergence in the molten glass 8. 37 designates an annular member which is by preference fluid cooled for releasable engagement without adhesion, with the top surface 38, of said float above the glass so that sufficient space being provided, the float may be maintained in any desired lateral or depressed position for drawing. 39 designates inlet and outlet pipes connected to support and provide for circulation of cooling fluid, if cooling means be used, through said member 37. They may be mounted for vertical movement, as indicated in connection with Fig. 9. I provide a refractory shield 39', preferably made in grooved sections and supported upon said member 37. I may, if I wish, construct my float with a vertical inner flange 40 to protect the cylinder 34 as drawn, from any possible chilling effect of said supporting holding member 37.

Figure 5:
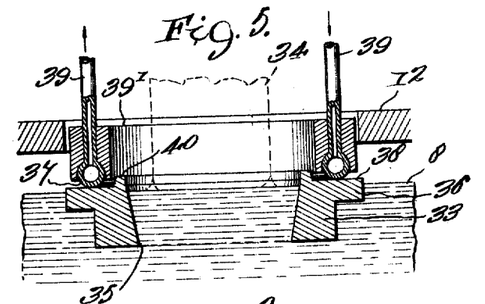
Figs. 5, 6, 7 and 8 are central vertical enlarged views in section, showing preferred forms of drawing members, and holders which may be used in connection with my improved tank.
Figure 6:
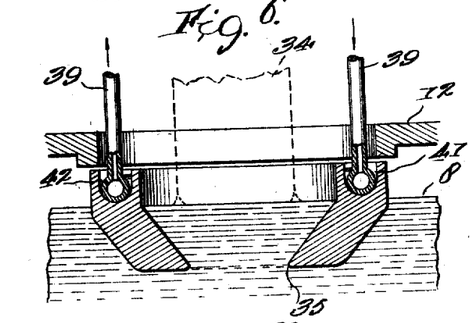

Fig. 6 is a view similar to Fig. 5, showing a ring adapted to float freely to any suitable position in the glass 8, and constructed without horizontal flange, and with the opening 35 still further reduced. I provide a groove 41 in the upper wall of said ring with which groove removably registers the annular fluid cooled pipe member 42, mounted for vertical movement by means of pipe 39 connected thereto, whereby fluid may be circulated therein. The float is thus held in position during drawing of the article 34. Preferably as shown, the groove 41 is made of such depth as to completely shield the article 34 as drawn from said member 42. After drawing, said member is elevated to free the ring float, whereupon said ring may be with little disturbance of the glass, shifted to position inside the tank near by, for reducing.

Figure 7:
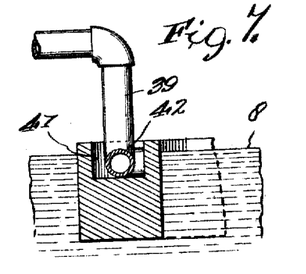

Fig. 7 is a partial sectional view of a modified ring float, showing the groove 41 enlarged to permit horizontal adjustment. Such adjustment may be attended with slight eccentricity of relation between the floating ring and holder.

Figure 8:
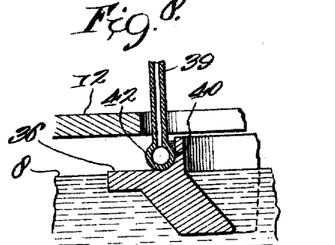

Fig. 8 shows another form of the invention wherein the ring float has a single upwardly extending flange 40 and a horizontally extending flange 36. The flange 40 serves to shield the glass cylinder being drawn from the cooling effects of the member 42.

Figure 9:
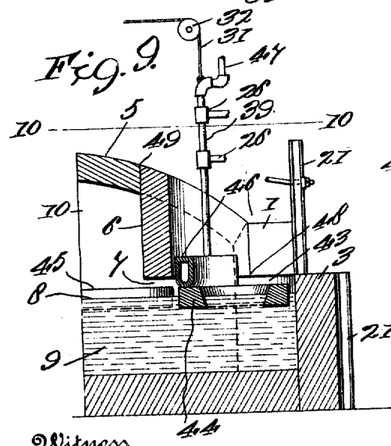
Fig. 9 is a sectional view of a modified tank and drawing station.
Figure 10:
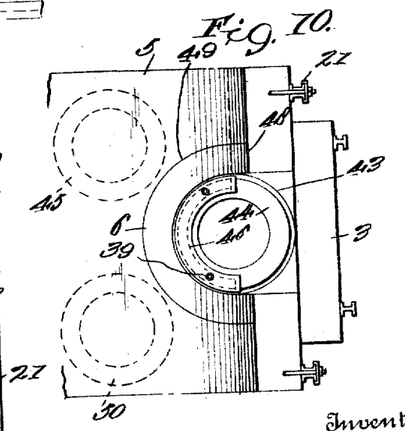
Fig. 10 is a top view, partly in section, on line 3—3 of the form shown in Fig. 9.

Fig. 9 is a central vertical view of a tank having a roofless drawing station, and Fig. 10 is a top plan view on line 10—10 in Fig. 9, of said tank. I show the inner recessed wall 6 above the glass, resting at point 48 upon the tank wall 1, and at point 49 against the tank crown 5. The tank 1 is cut or hollowed to form a curved opening 43 in the thickness thereof, in front of which opening I place a wall 3. I show a ring float 44, of smaller dimensions than said cut, in position for drawing, extending partly within the tank chamber 10, and with its front part ending outside the chamber in said curved cut 43. The ring is held in position by means of a partly annular hollow fluid cooled member 46, the ends of which project slightly within said cut 43, whereby to properly shut off space 7 and prevent excess of tank heat from reaching the glass within the ring 44 during drawing. It also engages the top of the ring on its tank side and thus holds the ring in position, at the same time cooling the ring on the tank side and leaving the outer side of the ring exposed to the outside air. This arrangement provides for equalization of the temperature of the ring, and equalization of the effect of the ring upon the cylinder during draw. It also provides for equalizing the effect upon the body of glass within the ring. It may be raised and lowered by means of pipes 39, connected thereto for circulating cooling fluid therethrough, and cable 31, wheel 32, or other suitable means, flexible fluid feeding pipes or conduit 47 being provided to pipe 39. After drawing, said member 46 is raised, freeing the ring 44 which may then be floated to position 50, in the tank chamber 10 for reducing, and ring 45, containing purified glass floated in position for drawing in the station provided.

The characteristic advantage and novelty of this form of drawing station will be apparent in that the semi- or partly annular fluid cooled member on the tank side compensates and equalizes drawing temperature with the free portion of the ring projecting within the line of wall of the tank. I may, however, make member 46 out of refractory material instead of metal, as shown. Mere contact of this member with a surface of the ring is sufficient to hold the latter in position by means of the friction between the ring and the member, as will be apparent, in all cases here presented.

I have shown my holding member in the forms discussed above, as well as in the forms to be referred to later, as provided with pipes or means for circulating cooling fluid. I may, in some instances, however, omit said pipes or means, and may employ holding members, whether of metal or refractory material, such as fire-clay, of mass sufficient to enable them to resist the heat of the furnace if exposed to such heat, for the period of draw, and thus avoid the use of specific cooling means. When made thus, my holding and supporting means may be either solid or hollow, and should be of character in other respects, corresponding to the forms here shown.

Figure 13:
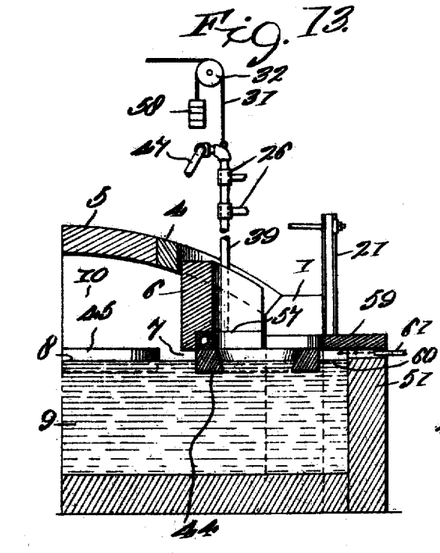
Fig. 13 is a partial central side vertical view showing the incurved front wall of the station mounted for vertical movement so that it may be used as a float holder in different positions of adjustment.

I may construct my device in any case, so that when the parts are in position for drawing, the support, the top of the float, and the drawing opening are exposed but little or not at all, to the heat of the glass tank or to ring heat. See, for instance, the construction shown in Fig. 6, where my holding device is exposed neither to tank or ring heat; Fig. 13, where said device is exposed to ring heat but not to tank heat, and Fig. 9 shows a form in which the support is exposed somewhat, to both ring and tank heat.

Figure 11:
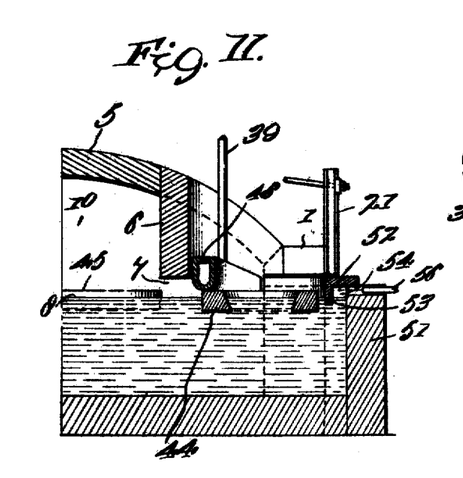
Fig. 11 is a central side sectional view of a tank having a heating extension and a partial roof.
Figure 12:
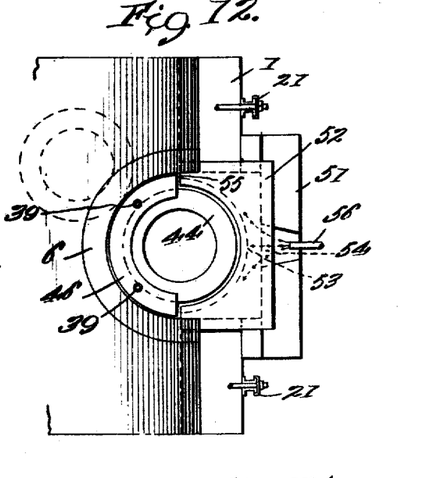
Fig. 12 is a top plan view of Fig. 11.

Fig. 11 is a vertical sectional view, and Fig. 12 a top plan view of a drawing station similar to that of Figs. 9 and 10, with the following distinction. Holding members 46 do not project within the thickness of wall 1, but project slightly into the tank chamber along said wall 1 and in such a way as to prevent excess of tank heat from passing to the drawing area; this also may taper gradually in any desired manner, toward both ends, (see Fig. 19, a top perspective view of member 46), to gradually reduce the cooling effect toward the free portion of the ring and thereby obtain finer adjustment of equalization of ring temperature for drawing.

I also show a projecting heating forehearth 51, and resting thereon and upon the tank wall 1, a partial roof or semi-circular roof 52 having a semi- or partial annular depending flange 53, which may be slightly above the glass, but in this case projects to or even below the surface of molten glass 8, the object being to form a partial or partly circular chamber 54 for heating the glass around the portion of the ring, the end of which ring projects exposed into the space within the line of tank wall 1, to thereby prevent freezing of the glass and ring; also preventing too abrupt cooling of the glass at such points. I preferably construct said roof 52 so that reverberated heat from the tank may in some degree pass therein at point 55. I may place a burner 56 in the center of the forehearth so that the flames may strike the apex of the depending flange 53 within the chamber 54, causing the flame or heat to diverge to heat the glass on both sides around the front end of the ring as indicated by the arrows.

I may also, in this case, make member 46 out of refractory material. After drawing, said member 46 is elevated to change a ring or reheat the glass at drawing point by placing a lid over the same and roof 52. This form of drawing station has important features of advantage. The ring 44 may be positioned near the roof 52 and closely exposed to the atmosphere, whereby the glass in the ring cools to proper temperature quickly and is in condition for rapid drawing, and yet avoid danger of the glass cooling to such a point as to freeze the front part of the ring 44 to the flange 53 of said roof 52, this being prevented by the heating chamber described.

Fig. 13 is another side sectional view showing a modified drawing station. In this case the curved recessed wall 6 is supported for vertical movement within arch 4 to move with respect to the molten glass. In this case I provide a fluid cooled support 57, which is sustained by pipes 39, which may be in any number, suitably connected to supply of cooling fluid therethrough, and suitably guided by sleeves 26 for vertical movement by means of cable 31, pulley 32, and flexible pipe conduit 47 leading to a source of fluid supply being connected thereto. I have also provided counterweight 58, whereby to ease the raising and lowering operation of said wall 6. The wall 6 is lowered so that its lower edge or fluid cooled support engages a part of the ring 44 and holds the same in drawing position in such a way as to prevent tank heat escaping in excess to the drawing point. The counterweight is, of course, adaptable elsewhere.

I provide a partial roof 59 above the glass, resting partly upon tank wall 1, and partly upon the top of heating forehearth chamber 51, to shield from the direct action of the atmosphere a portion of glass 60. I may provide a plurality of burners 61 to regulate temperature around the front part of the float ring 44 when in drawing position.

Figure 14:
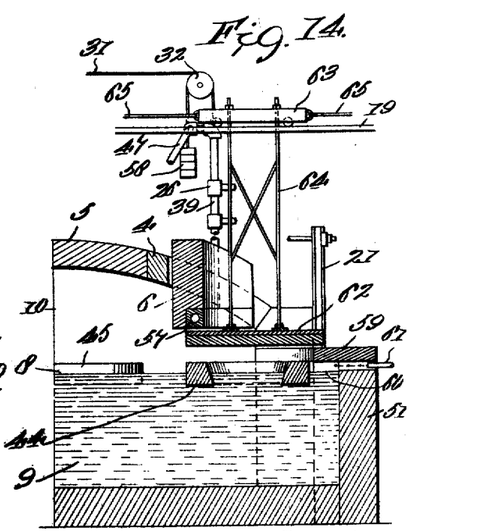
Fig. 14 is a view substantially the same as Fig. 13, showing a lid placed over the drawing station.

Fig. 14 is a view similar to Fig. 13, showing the wall 6 raised to free the ring 44 which ring now may be exchanged with ring 45 containing pure glass, in the tank chamber, or, the glass in ring 44 may be remelted while the ring is in drawing position, by bringing a lid 62 over the drawing station as shown, and allowing the heat from the tank to reduce the glass within the ring for a succeeding draw, this being rapidly accomplished by virtue of the close relation of my drawing station to the main tank furnace. The burner 61 may be made to assist in this, by furnishing heat supplemental to the heat of the tank.

The lid is operated horizontally in any suitable way. In this case I provide a double track 19, upon which travels a carriage 63, supporting the lid 62 by means of vertically adjustable cables or rods 64. This carriage is operated by means of rods or cable 65. When the glass is sufficiently remelted within the ring 44, the lid 62 is removed, wall 6 is lowered into position, and the drawing of the glass article may proceed without further delay.

Figures 15, 16, 17, 18, 19, 20, 21, 22, 23, 24, 25:
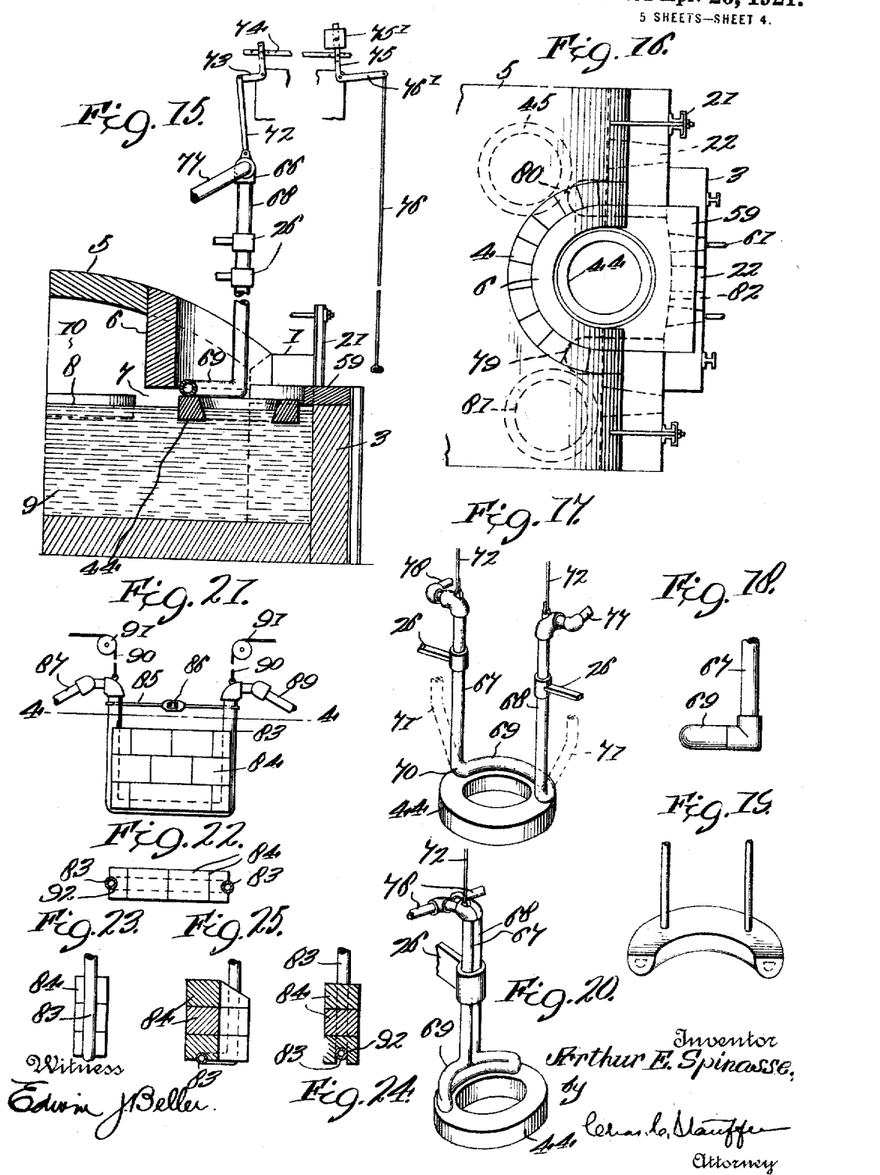

Fig. 15 is another sectional view of my drawing station to a tank, showing a modified form of shield or float holder 66.

Fig. 17, which is a perspective view of a slightly modified form of the holder, of Fig. 15, consists mainly of a pipe, bent so as to form two arms 67 and 68, with a lower portion bent at an angle to form a partly annular or semi-annular holder 69, which, as shown is adapted to engage a corresponding part of a ring or float 44, preferably on the portion which extends on the tank side as shown in Fig. 15. The curve of the pipe at 70 may be increased to produce its gradual removal from the float held thereby, or I may in some degree spread my pipe outwardly as shown by dotted line 71. I prefer to mount the holder with the arms slidingly guided in stationary sleeves 26 and connected to suitable links 72 extending vertically. The upper end of each link 72 is connected to the horizontal arm of a bell-crank lever 73. To the vertical arm of each of said levers is attached a link 74 extending across and connected to the vertical arm of another bell-crank lever 75, to the horizontal arm of which is connected a handle 76. On the vertical arm of lever 75 I provide a weight 75', the object of which is to hold lever 75 in position whichever way the handle is moved, as is obvious. The handle 76 may either pull on its rod 76' or push on it. Thus by the connection shown, the holder 66 may at once and easily be raised and lowered at the will of the operator. The handle may be held at any suitable height, and I provide in parts 73, 74, 75, holes for adjustments as desired. Weight 75' may, in some instances, be omitted. A motor may be used. To permit lowering or raising to or from position, flexible pipe connections 77, 78, are provided for passing cooling fluid through the holder.

Fig. 18 is a fractional side view of the holder showing the horizontal part 69 adjusted at a sharp right angle to the vertical arm 67.

Fig. 20 is another modified form of the holder, holding a float 44 in position. It comprises a pipe 68 bent and doubled to form a curved float holding part 69, as shown, so as to bring both arms 67 and 68 together on the hottest side of the tank, both being slidingly mounted in guiding sleeve 26. I provide flexible pipes 77 and 78 thereto, so that cooling fluid may be caused to pass or circulate through the holder in any of its positions, a link 72 being provided for raising and lowering. Other modifications are possible.

Fig. 16 is another top plan view of my drawing station, in this case showing a float ring 44 in position within the station, and partly extending into the body of glass within the tank chamber. I provide brackets or walls 79 and 80, shown in dotted lines, preferably rounded at their ends whereby after drawing, a ring or float may be moved with a rolling movement to reducing position in the tank chamber, as indicated by the ring 45 in dotted lines. This provides means for exposing different portions of the ring to different portions of the glass, tending to equalize the temperature of said ring. At the next shifting, ring 44 will take the place indicated by dotted line 81, and ring 45 the former position of ring 44 in the drawing station, or vice versa. This also provides means to more securely support the inner curved projecting wall 6, the base of which may rest in part at least, upon said brackets or walls. Openings 22 are provided to give access to the tank and drawing station. In this case I also show in dotted lines, the inner line of outer wall 3 at 82 curved outwardly.

In Figs. 21 to 25 I show improvement in constructing and supporting my tank wall, shade stone or top stone which may be used with advantage whether they are stationary or movable.

In Fig. 21 I show a pipe 83 bent to form a support of substantial U-shape as shown, supporting a sectional wall 84 consisting of blocks which may interlock, and which are preferably grooved to fit the pipe support. 85 indicates a bracing rod which may be slightly resilient to yield under expansion and contraction, and which is provided with a turn-buckle 86. Flexible pipes 87 and 89 are provided to circulate cooling fluid through the support 83, and also to permit vertical movement by suitable means, such as cable 0 and pulley 91, or the like.

Fig. 22 is a top view of Fig. 21 on line 4—4, showing water-cooled support 83 and groove 92 provided in the wall or blocks 84.

Fig. 23 is a side view of Fig. 22.

Fig. 24 indicates a side sectional view, there being a groove 92 made so deep as to substantially cover water-cooled support 83. This arrangement enables me to protect the pipe from the direct heat of the furnace, and to diminish greatly the quantity of water that is needed when the pipe is entirely or partly exposed to such heat.

Fig. 25 shows another side sectional view in which a curved wall 84 is supported in the same way. These water-cooled pipe supports may be exposed or partly or entirely hidden in the member supported thereon.

Figure 26:
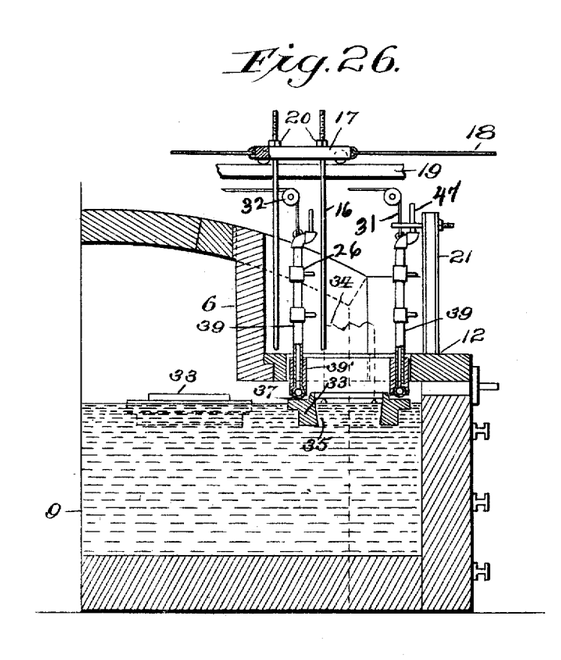
Fig. 26 is a view showing my preferred arrangement of float and tank.

Fig. 26 is a sectional view showing my preferred form. In this figure I show means whereby the member 39' may be raised by means of cable 31 over pulley 32 attached to pipes 39. The ring 33 may then be floated back into the furnace for reducing the refuse glass from the operation just completed and a new ring 33 floated into drawing position, whereupon the member 39 may be again lowered to hold said floating ring in position. The vertical and horizontal flanges shown protect the glass within the ring from the effect of the water in the support.

It will be noted that I have invented an improvement of great utility in glass tank furnaces and I intend that the terms which I employ in my description and claims, in respect to this invention, shall be broadly interpreted to cover all equivalents.

Having thus described my invention, what

I claim as new and desire to secure by Letters Patent of the United States, is:

1. A glass drawing furnace comprising a front wall and a roof terminating at this front wall, said front wall and roof being cut-away to form a drawing area, means parallel and in line with the front face of the front wall for closing the cut-away portion therein, and means fitting in the opening in the roof, depending into said furnace and surrounding the drawing area within the furnace.

2. A glass drawing furnace comprising a front wall and a roof terminating at this front wall, said front wall and roof being cut-away to form a drawing area, means parallel and in line with the front face of the front wall for closing the cut-away portion therein, means fitting in the opening in the roof, depending into said furnace and surrounding the drawing area within the furnace, and water cooled rods for supporting said means for surrounding the drawing area within the furnace.

3. A glass drawing furnace comprising a front wall and a roof terminating at this front wall, said front wall and roof being cut-away to form a drawing area, means parallel and in line with the front face of the front wall for closing the cut-away portion therein, means fitting in the opening in the roof, depending into said furnace and surrounding the drawing area within the furnace, water cooled rods for supporting said means for surrounding the drawing area, a carriage upon which said rods are mounted, and a track upon which said carriage may move to transport said surrounding means into and out of position.

4. In a glass drawing furnace, having a drawing opening extending from the furnace to and within the thickness of the furnace wall, there being an opening in the roof of the furnace shaped to suit the part of the drawing opening within the tank, a shade stone shaped to fit the opening in the roof, water cooled rods engaging said shade stone, a carriage upon which said rods are mounted, and a track upon which said carriage may move to transport said shade stone into and out of position.

5. A glass drawing furnace comprising a front wall and a roof terminating at this front wall, said front wall and roof being cut-away to form a drawing area, means parallel and in line with the front face of the front wall for closing the cut-away portion therein, means fitting in the opening in the roof, depending into said furnace and surrounding the drawing area within the furnace, a drawing ring for the drawing area, and a shield adapted to hold said drawing ring in position for drawing.

6. A glass drawing furnace comprising a front wall and a roof terminating at this front wall, said front wall and roof being cut-away to form a drawing area, means parallel and in line with the front face of the front wall for closing the cut-away portion therein, means fitting in the opening in the roof, depending into said furnace and surrounding the drawing area within the furnace, a drawing ring for the drawing area, a shield adapted to hold said drawing ring in position for drawing, and a water cooled holder for said shield.

7. A glass drawing furnace comprising a front wall and a roof terminating at this front wall, said front wall and roof being cut-away to form a drawing area, means parallel and in line with the front face of the front wall for closing the cut-away portion therein, means fitting in the opening in the roof, depending into said furnace and surrounding the drawing area within the furnace, a drawing ring for the drawing area, a shield adapted to hold said drawing ring in position for drawing, a water cooled holder for said shield, and means for shielding the drawing area from the cooling effects of said water cooled holder for the shield.

8. A glass drawing furnace comprising a front wall and a roof terminating at this front wall, said front wall and roof being cut-away to form a drawing area, means parallel and in line with the front face of the front wall for closing the cut-away portion therein, means fitting in the opening in the roof and depending into said furnace and surrounding the drawing area within the furnace, and a drawing ring adapted to float on the surface of the molten glass and to be moved directly into the drawing area, and movable water cooled means holding said drawing ring in position for drawing.

9. A glass drawing furnace comprising a front wall and a roof terminating at this front wall, said front wall and roof being cut-away to form a drawing area, means parallel and in line with the front face of the front wall for closing the cut-away portion therein, means fitting in the opening in the roof and depending into said furnace and surrounding the drawing area within the furnace, a drawing ring adapted to float on the surface of the molten glass and to be moved directly into the drawing area, movable water cooled means holding said drawing ring in position for drawing, and means for shielding the drawing area from the cooling effects of said water cooled means.

10. In a glass drawing tank, having a drawing station, a removable roof for said station, said roof having a suitable drawing hole therein, a series of floating drawing rings, any of which may be floated from the tank to the drawing station, fluid cooled means adapted to be passed through said opening to engage and hold said ring, and means whereby the glass within the drawing ring may be protected from the chilling effect of said water-cooled holding means.

11. In a glass drawing tank, in combination, a drawing station, a floating drawing ring, a flange projecting up from the top of said drawing ring, and a water-cooled ring-holding means adapted to engage said ring on its top without the flange to hold it in drawing position while the flange protects the glass within the ring from the chilling effect of said water-cooled ring-holding means.

12. A glass drawing furnace comprising a front wall and a roof terminating at this front wall, said front wall and roof being cut-away to form a drawing area, means parallel and in line with the front face of the front wall for closing the cut-away portion therein, means fitting in the opening in the roof and depending into said furnace and surrounding the drawing area within the furnace, and a series of floating drawing rings adapted to be moved one at a time into said drawing area, and movable water cooled means for holding the floating rings in drawing position.

13. In a glass drawing tank, in combination, a drawing station partly within the tank and extending into the thickness of the tank wall, the roof of the tank being provided with an opening whereby the front of the tank is exposed, a shade stone adapted to fit the opening in the front of the tank, means protected against the heat of the furnace adapted to engage and support said stone, whereby said stone is supported by a cooled and non-warping frame.

14. A glass drawing tank comprising a front wall and a roof terminating at said front wall, said front wall being cut-away to form an opening, a wall parallel with the outer face and adjacent thereto for closing said opening in the outer wall, a semi-circular opening in the roof in line with the opening in the outer wall, a vertically extending shade stone fitting said opening in the roof and depending in the furnace, a horizontally extending member having an opening therethrough fitting said shade stone and together with said shade stone closing the opening in the wall and roof, a drawing opening in said horizontal member, means for removably supporting said shade stone, a series of floating drawing rings adapted to be moved one at a time beneath the drawing opening, and means movable through the drawing opening for holding said drawing rings in place during drawing.

15. A glass drawing tank comprising a front wall and a roof terminating at said front wall, said front wall being cut away to form an opening, a wall parallel with the outer face and adjacent thereto for closing said opening in the outer wall, a semi-circular opening in the roof in line with the opening in the outer wall, a vertically extending shade stone fitting said opening in the roof and depending into the furnace, a horizontally extending member having an opening therethrough fitting said shade stone and together with said shade stone closing the opening in the wall and roof, a drawing opening in said horizontal member, means for removably supporting said shade stone, a series of floating drawing rings adapted to be moved one at a time beneath the drawing opening, and water cooled means extending through said opening for holding said drawing rings in place for drawing.

16. A glass drawing tank comprising a front wall and a roof terminating at said front wall, said front wall being cut away to form an opening, a wall parallel with the outer face and adjacent thereto for closing said opening in the outer wall, a semi-circular opening in the roof in line with the opening in the outer wall, a vertically extending shade stone fitting said opening in the roof and depending into the furnace, a horizontally extending member having an opening therethrough fitting said shade stone and together with said shade stone closing the opening in the wall and roof, a drawing opening in said horizontal member, means for removably supporting said shade stone, a series of floating drawing rings adapted to be moved one at a time beneath the drawing opening, and water cooled means extending through said opening for holding said drawing rings in place for drawing, said drawing ring having a vertical upwardly extending flange for protecting the drawing area from said water cooled means for said ring.

17. In a glass drawing apparatus, in combination, a segregating float having its top projecting above the level of the glass when it is in floating position, and in combination therewith a curved holding means, adapted to contact with the top of said ring and to hold said ring at desired position and depth, said float having means to shield the glass from the effect of the ring.

18. An annular tubular conduit or pipe, means for circulating cooling fluid therethrough, and a glass segregating float so constructed that a portion of its top may project above the glass, said float being provided with a projecting part whereby said float may shield the source of draw from the chilling effect of the pipe, and means whereby said pipe or conduit may be moved and adjusted vertically and laterally, the float and ring having such diameter as to permit relative movement.

In testimony whereof, I affix my signature.

ARTHUR E. SPINASSE.